US012597841B2

(12) United States Patent
Li

(10) Patent No.: US 12,597,841 B2
(45) Date of Patent: Apr. 7, 2026

(54) MULTIPHASE POWER SUPPLY WITH STATUS SYNCHRONIZATION

(71) Applicant: Chengdu Monolithic Power Systems Co., Ltd., Chengdu (CN)

(72) Inventor: Lei Li, Chengdu (CN)

(73) Assignee: Chengdu Monolithic Power Systems Co., Ltd., Chengdu (CN)

( * ) Notice: Subject to any disclaimer, the term of this patent is extended or adjusted under 35 U.S.C. 154(b) by 53 days.

(21) Appl. No.: 18/617,161

(22) Filed: Mar. 26, 2024

(65) Prior Publication Data

US 2024/0333123 A1 Oct. 3, 2024

(30) Foreign Application Priority Data

Mar. 29, 2023 (CN) .......................... 202310323761.X

(51) Int. Cl.
*H02M 1/14* (2006.01)
*H02M 1/00* (2006.01)
*H02M 3/04* (2006.01)

(52) U.S. Cl.
CPC ........... *H02M 1/0003* (2021.05); *H02M 1/14* (2013.01); *H02M 3/04* (2013.01)

(58) Field of Classification Search
None
See application file for complete search history.

(56) References Cited

U.S. PATENT DOCUMENTS

| | | | | |
|---|---|---|---|---|
| 7,215,102 B2 * | 5/2007 | Harris | ................. | H02M 3/1584 |
| | | | | 323/268 |
| 10,270,343 B2 * | 4/2019 | Nguyen | .............. | H02M 3/1584 |
| 11,356,023 B2 * | 6/2022 | Jiang | ................... | H02M 3/1584 |
| 11,791,705 B1 * | 10/2023 | Chang | ................. | H02M 1/0041 |
| | | | | 363/65 |
| 2011/0133553 A1 * | 6/2011 | Bui | ........................ | H02M 3/158 |
| | | | | 307/31 |
| 2012/0274293 A1 | 11/2012 | Ren et al. | | |
| 2015/0236580 A1 | 8/2015 | Jiang et al. | | |
| 2016/0315538 A1 | 10/2016 | Nguyen et al. | | |
| 2017/0279454 A1 | 9/2017 | Li | | |
| 2018/0131379 A1 | 5/2018 | Li | | |
| 2022/0100253 A1 | 3/2022 | Zhou et al. | | |
| 2024/0055986 A1 | 2/2024 | Banappagol et al. | | |
| 2024/0186900 A1 * | 6/2024 | Zhang | ................. | H02M 3/1586 |

* cited by examiner

*Primary Examiner* — Jeffrey S Zweizig
(74) *Attorney, Agent, or Firm* — Perkins Coie LLP

(57) ABSTRACT

A multiphase power supply has a plurality of integrated circuits, which respectively have a converter and a controller. Each of the integrated circuits further has a status pin and a set pin. All the status pins are coupled together, and all the set pins are coupled together, to have the multiphase power supply provide great coordination between the controllers.

15 Claims, 6 Drawing Sheets

MULTIPHASE POWER SUPPLY WITH STATUS SYNCHRONIZATION

CROSS-REFERENCE TO RELATED APPLICATIONS

This application claims priority to and the benefit of Chinese Patent Application No. 202310323761.X, filed Mar. 29, 2023, which is incorporated herein by reference in its entirety.

BACKGROUND OF THE INVENTION

In power conversion applications, interleaved multi-phase power supplies are widely used in large power and large current conditions because the multi-phase power supply is able to provide a large output current with a small current ripple. In addition, the multi-phase power supply is characterized in optimized thermal and power distributions. A dedicated controller may be used to synchronize the converters to generate interleaved output voltages. However, the dedicated controller increases the cost and complexity of the multi-phase power supply.

Thus, power supplies with multiple converters typically adopt multiple controllers, while one controller acts as the master, and the other controllers act as slaves.

How the controllers coordinate with each other is a challenge.

SUMMARY OF THE INVENTION

In accordance with an embodiment of the present invention, a multiphase power supply is discussed. The multiphase power supply comprises a plurality of integrated circuits. Each of the integrated circuits has an input pin, a converter, and a status pin. The input pin is configured to receive an input voltage. The converter is configured to convert the input voltage to a desired output voltage. The status pins of all the integrated circuits are coupled together, to synchronize a state of all the integrated circuits.

In addition, in accordance with an embodiment of the present invention, a multiphase power supply is discussed. The multiphase power supply comprises a plurality of integrated circuits. Each of the integrated circuits has an input pin, a status pin, and a set pin. The input pin is configured to receive an input voltage. The status pins of all the integrated circuits are coupled together, to synchronize a state of all the integrated circuits. The set pins of all the integrated circuits are coupled together, to set a switching frequency of the integrated circuits.

Furthermore, in accordance with an embodiment of the present invention, an integrated circuit used in a multiphase power supply is discussed. The multiphase power supply includes a plurality of integrated circuits. Each of the integrated circuit has an input pin, a converter, and a status pin. The input pin is configured to receive an input voltage. The converter is configured to convert the input voltage to a desired output voltage. The status pins of all the integrated circuits are coupled together, to synchronize a state of all the integrated circuits.

The use of the similar reference label in different drawings indicates the same of like components.

DETAILED DESCRIPTION OF THE INVENTION

Embodiments of circuits for multiphase power supply are described in detail herein. In the following description, some specific details, such as example circuits for these circuit components, are included to provide a thorough understanding of embodiments of the invention. One skilled in relevant art will recognize, however, that the invention can be practiced without one or more specific details, or with other methods, components, materials, etc.

The following embodiments and aspects are illustrated in conjunction with circuits and methods that are meant to be exemplary and illustrative. In various embodiments, the above problem has been reduced or eliminated, while other embodiments are directed to other improvements.

Figure 1:
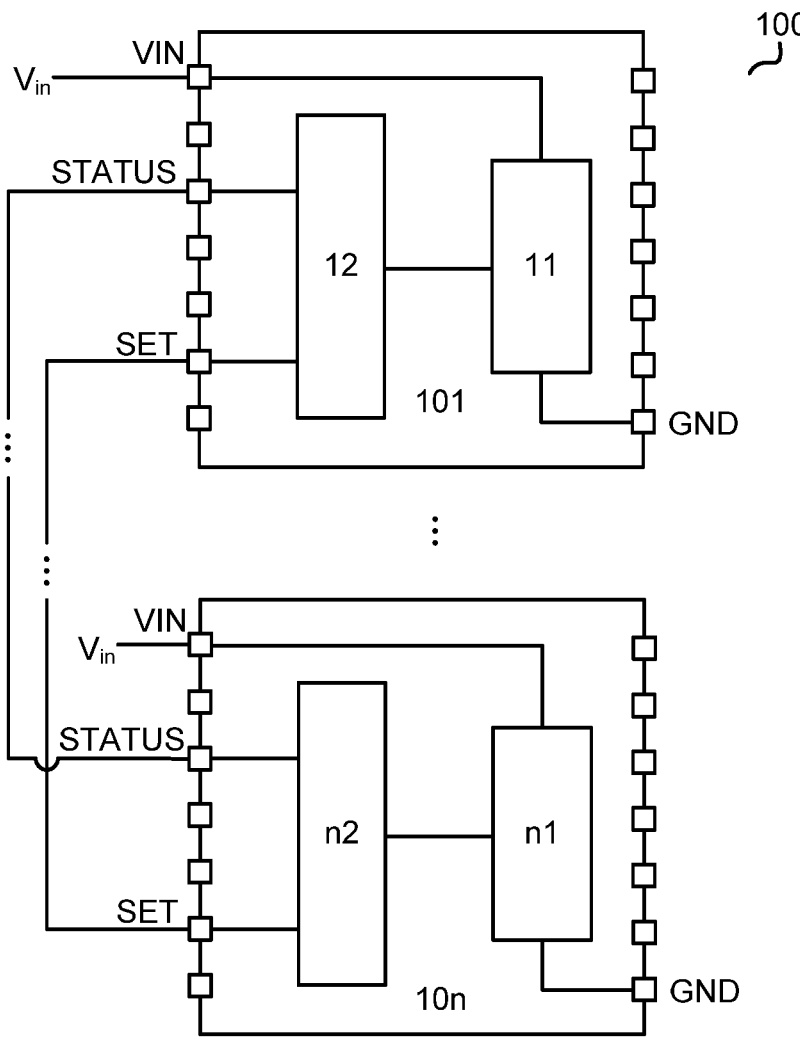
FIG. 1 schematically shows a multiphase power supply 100 in accordance with an embodiment of the present invention.

FIG. 1 schematically shows a multiphase power supply 100 in accordance with an embodiment of the present invention. In the example of FIG. 1, the multiphase power supply 100 comprises a plurality of integrated circuits (ICs) (e.g., 101, 10n, wherein n is an integer larger than 1). Each of the ICs has: a converter, configured to convert an input voltage Vin received at an input pin VIN to a desired output voltage; and a status pin STATUS, wherein the status pins of all the ICs are coupled together, to synchronize a state of all the ICs. The ICs may comprise different states, such as: a power on state, a power off state, and a normal operation state. The normal operation state may comprise different circuit operation modes (e.g., continuous current mode, CCM; or discontinuous current mode, DCM), different circuit protection modes (e.g., over voltage protection, under voltage protection, over temperature protection, or over current protection), etc.

Figure 2:
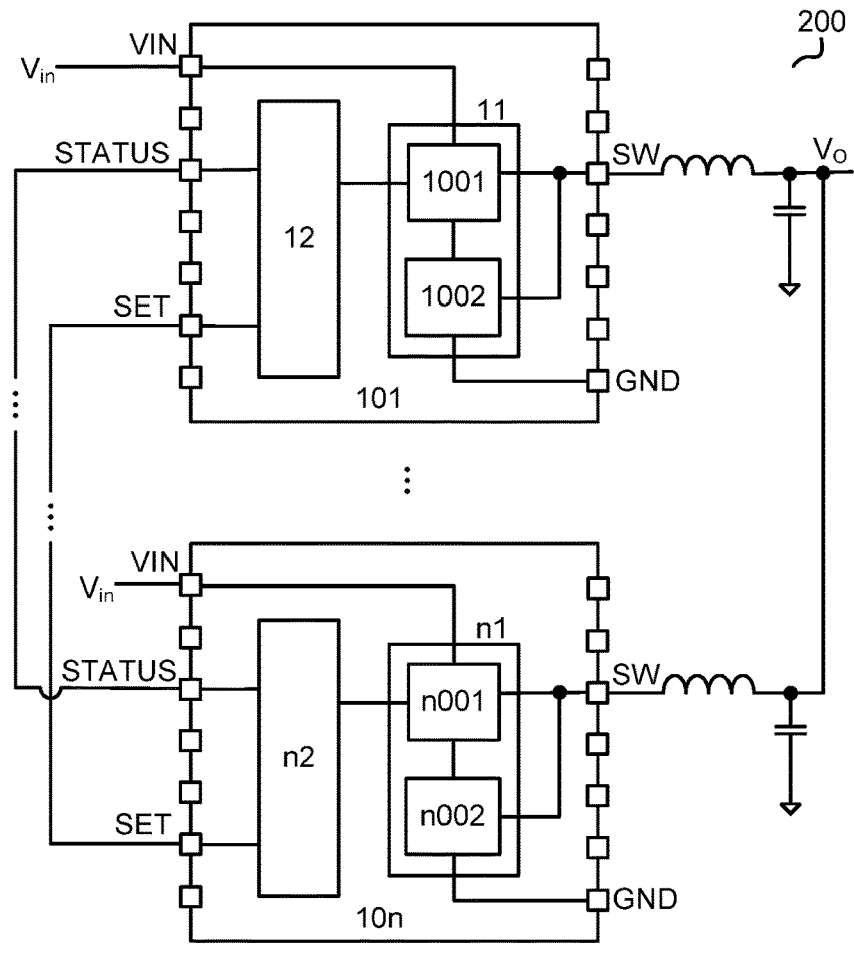
FIG. 2 schematically shows a multiphase power supply 200 in accordance with an embodiment of the present invention.

In one embodiment of the present invention, the converter may comprise a DC-DC converter (e.g., 11 and n1 as shown in FIG. 1). The DC-DC converter may comprise a buck converter, a boost converter, or other appropriate circuits. Each IC further comprises a control circuit (e.g., 12 and n2 as shown in FIG. 2), configured to control the converter. One of the ICs acts as master, other ICs act as slaves.

In one embodiment of the present invention, each IC further has a set pin SET. The set pins of all the ICs are coupled together, to set a switching frequency of the ICs. The IC acted as the master is configured to provide a clock signal at its set pin. The ICs acted as slaves are configured to receive the clock signal at their set pins, respectively.

In one embodiment of the present invention, the IC may further have other pins, such as a ground pin GND.

FIG. 2 schematically shows a multiphase power supply 200 in accordance with an embodiment of the present invention. In the example of FIG. 2, the DC-DC converter in each of the ICs comprises: a first power switch (e.g. 1001, . . . , and n001) and a second power switch (e.g., 1002, . . . , and n002), series coupled between the input pin VIN and the ground pin GND. A switch node formed by a common connection of the first power switch and the second power switch is coupled to a switch pin SW.

In one embodiment of the present invention, the first power switch and the second power switch are both formed as dies, which are set inside the IC. The first power switch and the second power switch may comprise various of controllable semiconductor switching devices, such as MOSFET, BJT, IGBT, etc.

In one embodiment of the present invention, the switch pin SW may be externally coupled to an inductor and a capacitor, to filter a switch signal at the switch pin SW. The switch pins of all the ICs are coupled together by way of a respective inductor and a respective capacitor, to provide the desired output voltage $V_O$. In an alternative embodiment of the present invention, the inductor and the capacitor may be integrated inside the IC. The IC may have an output pin, which directly provides desire output signals (e.g., an output voltage or an output current).

Figure 3:
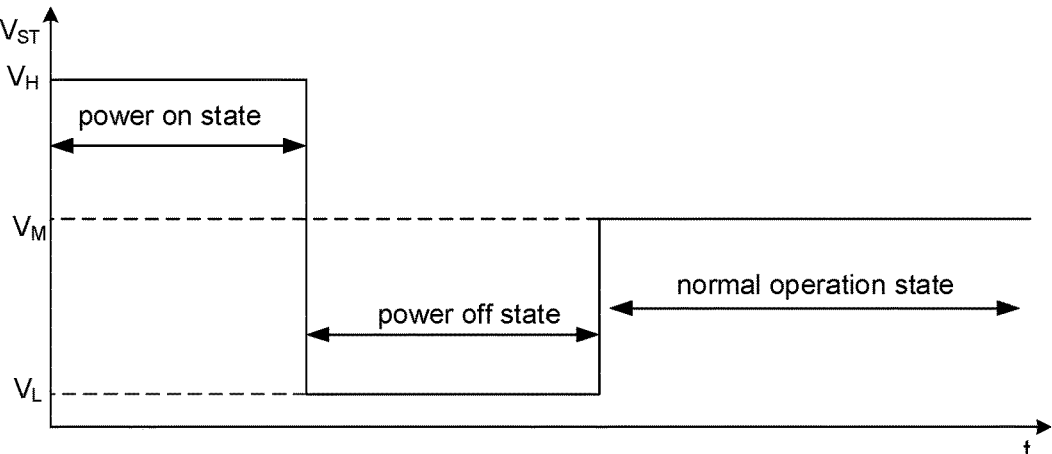
FIG. 3 schematically illustrates the timing waveform of the voltage $V_{ST}$ at the STATUS pin in accordance with an embodiment of the present invention.

In one embodiment of the present invention, the multiphase power supply is operable to control all the ICs to enter different states by setting different voltage levels at the status pin STATUS. If the status pin STATUS is pulled low (e.g., a voltage $V_{ST}$ of the status pin STATUS is set to be a low voltage threshold $V_L$), each of the ICs enters the power off state; if the status pin STATUS is pulled high (e.g., the voltage of the status pin STATUS is set to be a high voltage threshold $V_H$), each of the ICs enters the power on state; and if the status pin STATUS is pulled to a medium value (e.g., the voltage of the status pin STATUS is to set to be a medium voltage threshold $V_M$), each of the ICs enters the normal operation, as shown in FIG. 3.

Figure 4:
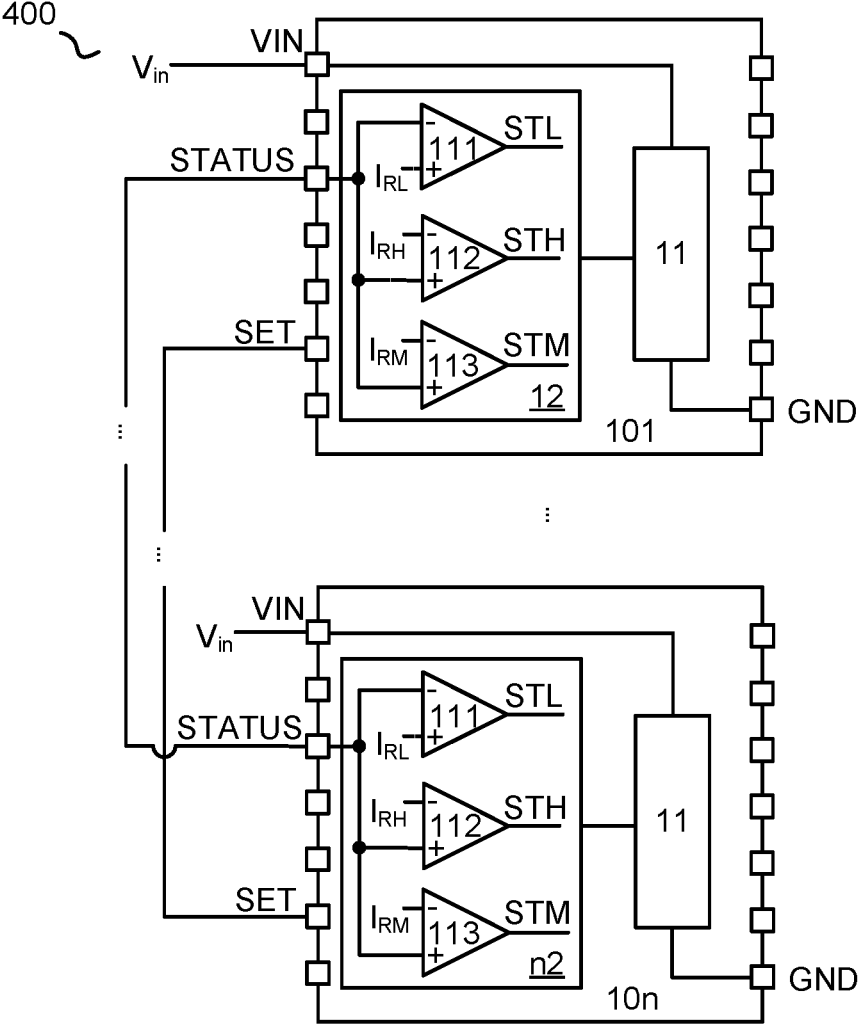
FIG. 4 schematically shows a multiphase power supply 400 in accordance with an embodiment of the present invention.

FIG. 4 schematically shows a multiphase power supply 400 in accordance with an embodiment of the present invention. In the example of FIG. 4, the control circuit in each of the ICs comprises: a first comparator 111, a second comparator 112 and a third comparator 113. The first comparator 111 is configured to compare a voltage at the status pin with a power off threshold $I_{RL}$, to generate a power off signal STL, which is operable to control the DC-DC converter to enter the power off state, e.g., to start a power off sequence. The second comparator 112 is configured to compare the voltage at the status pin with a power on threshold $I_{RH}$, to generate a power on signal STH, which is operable to control the DC-DC converter to enter the power on state, e.g., to start a power on sequence. The third comparator 113 is configured to compare the voltage at the status pin with a medium threshold $I_{RM}$, to generate a control signal STM, which is operable to control the DC-DC converter to enter a desired operation mode (e.g., CCM).

Figure 5:
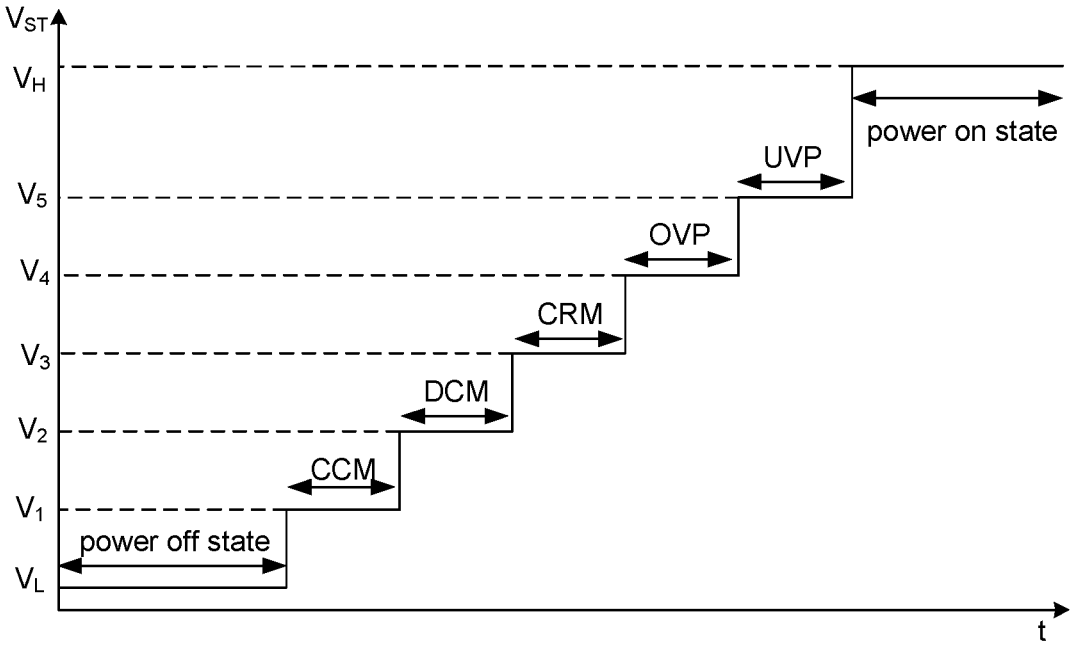
FIG. 5 schematically illustrates the timing waveform of the voltage $V_{ST}$ at the STATUS pin in accordance with another embodiment of the present invention.

In an alternative embodiment of the present invention, the multiphase power supply is operable to control all the $I_{CS}$ to enter different states by setting different voltage values at the status pin STATUS. For example, if the status pin STATUS is pulled low (e.g., the voltage of the status pin STATUS is set to be the low voltage threshold $V_L$), each of the ICs enters the power off state; if the status pin STATUS is pulled high (e.g., the voltage of the status pin STATUS is set to be the high voltage threshold $V_H$), each of the ICs enters the power on state; if the voltage value at the status pin STATUS is higher than a first threshold (e.g., the voltage of the status pin STATUS is to set to be a first voltage $V_1$), each of the ICs enters continuous current mode (CCM); if the voltage value at the status pin STATUS is higher than a second threshold (e.g., the voltage of the status pin STATUS is to set to be a second voltage $V_2$), each of the ICs enters discontinuous current mode (DCM); if the voltage value at the status pin STATUS is higher than a third threshold (e.g., the voltage of the status pin STATUS is to set to be a third voltage $V_3$), each of the ICs enters critical current mode (CRM); if the voltage value at the status pin STATUS is higher than a fourth threshold (e.g., the voltage of the status pin STATUS is to set to be a fourth voltage $V_4$), each of the ICs enters over voltage protection mode (OVP); if the voltage value at the status pin STATUS is higher than a fifth threshold ((e.g., the voltage of the status pin STATUS is to set to be a fifth voltage $V_5$), each of the ICs enters under voltage protection mode (UVP), etc., as shown in FIG. 5.

Figure 6:
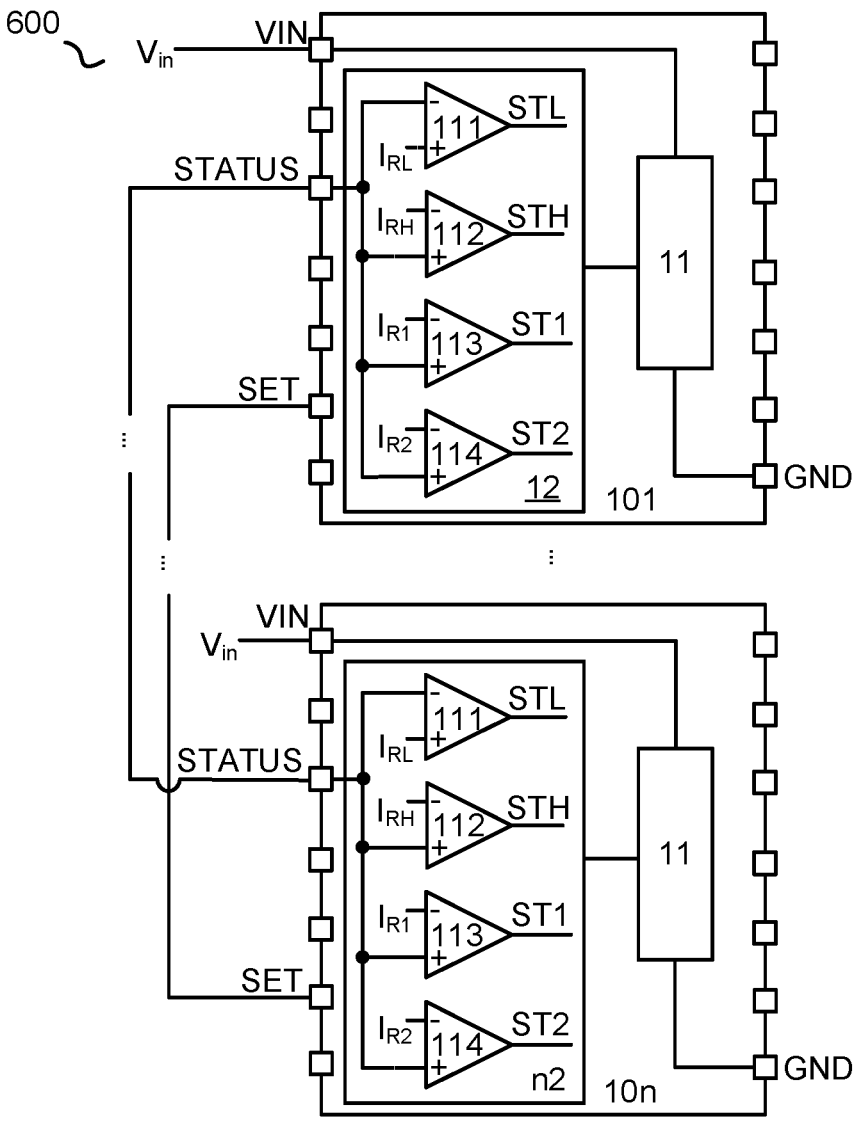
FIG. 6 schematically shows a multiphase power supply 600 in accordance with an embodiment of the present invention.

FIG. 6 schematically shows a multiphase power supply 600 in accordance with an embodiment of the present invention. In the example of FIG. 6, the control circuit in each of the ICs comprises: a first comparator 111, a second comparator 112, a third comparator 113 and a fourth comparator 114. The first comparator 111 is configured to compare a voltage at the status pin with a power off threshold $I_{RL}$, to generate a power off signal STL, to control the DC-DC converter to enter the power off state. The second comparator 112 is configured to compare the voltage at the status pin with a power on threshold $I_{RH}$, to generate a power on signal STH, to control the DC-DC converter to enter the power on state. The third comparator 113 is configured to compare the voltage at the status pin with a first threshold $I_{R1}$, to generate a first control signal ST1, to control the DC-DC converter to enter a first operation mode (e.g., CCM). The fourth comparator is configured to compare the voltage at the status pin with a second threshold $I_{R2}$, to generate a second control signal ST2, to control the DC-DC converter to enter a second operation mode (e.g., DCM).

The multiphase power supply 600 in the embodiment of FIG. 6 is configured to control the ICs to enter four different states by controlling the status pin at four different voltage values. However, one skilled in the art should realize that the ICs may enter more different states by controlling the voltage at the status pin at more different voltage values. For example, more comparators may be used, or digital control methods may be used, to control the ICs to enter a corresponding state when the voltage at the status pin is at a corresponding voltage value.

Figure 7:
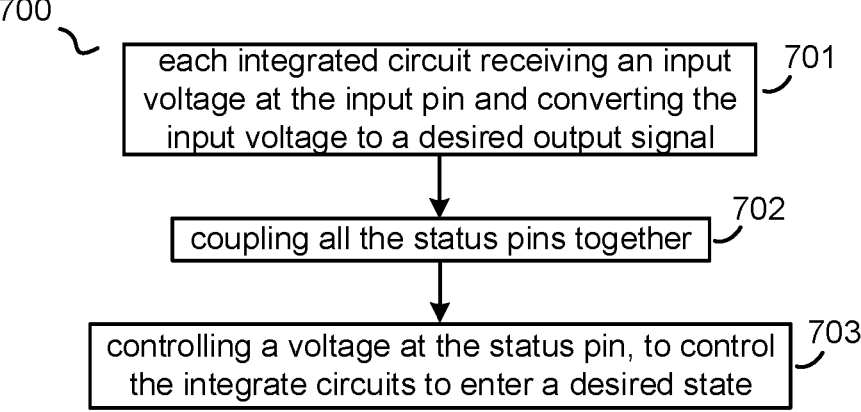
FIG. 7 schematically shows a flowchart 700 of a method used in a multiphase power supply in accordance with an embodiment of the present invention.

FIG. 7 schematically shows a flowchart 700 of a method used in a multiphase power supply in accordance with an embodiment of the present invention. The multiphase power supply has a plurality of integrated circuits, each of the integrated circuits at least includes an input pin and a status pin. The method comprises:

Step 701, each integrated circuit receiving an input voltage at the input pin and converting the input voltage to a desired output signal.

Step 702, coupling all the status pins together. And

Step 703, controlling a voltage at the status pin, to control the integrate circuits to enter a desired state. The state may comprise a power on state, a power off state, a normal operation state (e.g., different circuit operation modes, different circuit protection modes), etc.

In one embodiment of the present invention, the method further comprises: pulling the voltage at the status pin high, to control the integrated circuits to enter a power on state; pulling the voltage at the status pin low, to control the integrated circuits to enter a power off state; and pulling the voltage at the status pin to a medium voltage value, to control the integrated circuits to enter a normal operation.

In one embodiment of the present invention, the method further comprises: pulling the voltage at the status pin high, to control the integrated circuits to enter a power on state; pulling the voltage at the status pin low, to control the integrated circuits to enter a power off state; setting the voltage at the status pin to be higher than a first voltage threshold, to control the integrated circuits to enter continuous current mode; setting the voltage at the status pin to be higher than a second voltage threshold, to control the integrated circuits to enter discontinuous current mode; setting the voltage at the status pin to be higher than a third voltage threshold, to control the integrated circuits to enter critical current mode; setting the voltage at the status pin to be higher than a fourth voltage threshold, to control the integrated circuits to enter over voltage protection mode; and setting the voltage at the status pin to be higher than a fifth voltage threshold, to control the integrated circuits to enter under voltage protection mode.

In one embodiment of the present invention, each of the integrated circuits further has a set pin. All the set pins are coupled together. One of the integrate circuits is configured to provide a clock signal at its set pin, and the remaining integrated circuits are configured to receive the clock signal at their set pins.

It is to be understood in these letters patent that the meaning of "A" is coupled to "B" is that either A and B are connected to each other as described below, or that, although A and B may not be connected to each other as described above, there is nevertheless a device or circuit that is connected to both A and B. This device or circuit may include active or passive circuit elements, where the passive circuit elements may be distributed or lumped-parameter in nature. For example, A may be connected to a circuit element that in turn is connected to B.

This written description uses examples to disclose the invention, including the best mode, and also to enable a person skilled in the art to make and use the invention. The patentable scope of the invention may include other examples that occur to those skilled in the art.

The invention claimed is:

1. A multiphase power supply, comprising:

a plurality of integrated circuits, each of the integrated circuits having:

an input pin, configured to receive an input voltage;

a converter, configured to convert the input voltage to a desired output voltage; and a status pin, wherein the status pins of all the integrated circuits are coupled together, to synchronize a state of all the integrated circuits; and wherein the state of the integrated circuits comprises: a power on state, a power off state, and a normal operation state.

2. The multiphase power supply of claim 1, wherein:

all the integrated circuits are controlled to enter the power on state if the status pin is pulled high;

all the integrated circuits are controlled to enter the power off state if the status pin is pulled low; and all the integrated circuits are controlled to enter the normal operation state if the status pin is pulled to a medium value.

3. The multiphase power supply of claim 1, wherein each of the integrated circuits further has a control circuit, and wherein the control circuit comprises:

a first comparator, configured to compare a voltage at the status pin with a power off voltage threshold, to generate a power off signal, to control the converter to enter a power off state;

a second comparator, configured to compare the voltage at the status pin with a power on voltage threshold, to generate a power on signal, to control the converter to enter a power on state; and a third comparator, configured to compare the voltage at the status pin with a medium voltage threshold, to generate a control signal, to control the converter to enter a normal operation state.

4. The multiphase power supply of claim 1, wherein:

all the integrated circuits are controlled to enter a power on state if a voltage of the status pin is pulled high;

all the integrated circuits are controlled to enter a power off state if the voltage of the status pin is pulled low;

all the integrated circuits are controlled to enter continuous current mode if a voltage value at the status pin is higher than a first threshold;

all the integrated circuits are controlled to enter discontinuous current mode if the voltage value at the status pin is higher than a second threshold;

all the integrated circuits are controlled to enter critical current mode if the voltage value at the status pin is higher than a third threshold;

all the integrated circuits are controlled to enter over voltage protection mode if the voltage value at the status pin is higher than a fourth threshold; and all the integrated circuits are controlled to enter under voltage protection mode if the voltage value at the status pin is higher than a fifth threshold.

5. The multiphase power supply of claim 1, wherein each of the integrated circuits further has a control circuit, and wherein the control circuit comprises:

a first comparator, configured to compare a voltage at the status pin with a power off threshold, to generate a power off signal, to control the converter to enter a power off state;

a second comparator, configured to compare the voltage at the status pin with a power on threshold, to generate a power on signal, to control the converter to enter a power on state;

a third comparator, configured to compare the voltage at the status pin with a first threshold, to generate a first control signal, to control the converter to enter a first operation mode; and a fourth comparator, configured to compare the voltage at the status pin with a second threshold, to generate a second control signal, to control the converter to enter a second operation mode.

6. The multiphase power supply of claim 1, wherein each of the integrated circuits further has:

a set pin, wherein the set pins of all the integrated circuits are coupled together, to set a switching frequency of the integrated circuits.

7. A multiphase power supply, comprising:

a plurality of integrated circuits configured to convert an input voltage to an output voltage, each of the integrated circuits having:

an input pin, configured to receive the input voltage;

a status pin, wherein the status pins of all the integrated circuits are coupled together, to synchronize a state of all the integrated circuits; and a set pin, wherein the set pins of all the integrated circuits are coupled together, to set a switching frequency of the integrated circuits; and wherein the state of the integrated circuits comprises: a power on state, a power off state, and a normal operation state.

8. The multiphase power supply of claim 7, wherein:

all the integrated circuits are controlled to enter the power on state if the status pin is pulled high;

all the integrated circuits are controlled to enter the power off state if the status pin is pulled low; and all the integrated circuits are controlled to enter the normal operation state if the status pin is pulled to a medium value.

9. The multiphase power supply of claim 7, wherein each of the integrated circuits has a converter and a control circuit, wherein the converter is configured to convert the input voltage to the output voltage, and wherein the control circuit comprises:

a first comparator, configured to compare a voltage at the status pin with a power off threshold, to generate a power off signal, to control the converter to enter a power off state;

a second comparator, configured to compare the voltage at the status pin with a power on threshold, to generate a power on signal, to control the converter to enter a power on state; and a third comparator, configured to compare the voltage at the status pin with a medium threshold, to generate a control signal, to control the converter to enter a normal operation state.

10. The multiphase power supply of claim 7, comprising:

all the integrated circuits are controlled to enter a power on state if the status pin is pulled high;

all the integrated circuits are controlled to enter a power off state if the status pin is pulled low;

all the integrated circuits are controlled to enter continuous current mode if a voltage value at the status pin is higher than a first threshold;

all the integrated circuits are controlled to enter discontinuous current mode if the voltage value at the status pin is higher than a second threshold;

all the integrated circuits are controlled to enter critical current mode if the voltage value at the status pin is higher than a third threshold;

all the integrated circuits are controlled to enter over voltage protection mode if the voltage value at the status pin is higher than a fourth threshold; and all the integrated circuits are controlled to enter under voltage protection mode if the voltage value at the status pin is higher than a fifth threshold.

11. The multiphase power supply of claim 7, wherein each of the integrated circuits has a converter and a control circuit, wherein the converter is configured to convert the input voltage to the output voltage, and wherein the control circuit comprises:

a first comparator, configured to compare a voltage at the status pin with a power off threshold, to generate a power off signal, to control the converter to enter a power off state;

a second comparator, configured to compare the voltage at the status pin with a power on threshold, to generate a power on signal, to control the converter to enter a power on state; and a third comparator, configured to compare the voltage at the status pin with a first threshold, to generate a first control signal, to control the converter to enter a first operation mode; and a fourth comparator, configured to compare the voltage at the status pin with a second threshold, to generate a second control signal, to control the converter to enter a second operation mode.

12. An integrated circuit used in a multiphase power supply, wherein the multiphase power supply includes a plurality of integrated circuits, each of the integrated circuit comprising:

an input pin, configured to receive an input voltage;

a converter, configured to convert the input voltage to a desired output voltage; and a status pin, wherein the status pins of all the integrated circuits are coupled together, to synchronize a state of all the integrated circuits; and wherein the state comprises: a power on state, a power off state, and a normal operation state.

13. The integrated circuit of claim 12, wherein the integrated circuit is controlled to:

enter the power on state if the status pin is pulled high;

enter the power off state if the status pin is pulled low; and enter the normal operation state if the status pin is pulled to a medium value.

14. The integrated circuit of claim 12, wherein the integrated circuit is controlled to:

enter a power on state if a voltage of the status pin is pulled high;

enter a power off state if the voltage of the status pin is pulled low;

enter continuous current mode if a voltage value at the status pin is higher than a first threshold;

enter discontinuous current mode if the voltage value at the status pin is higher than a second threshold;

enter critical current mode if the voltage value at the status pin is higher than a third threshold;

enter over voltage protection mode if the voltage value at the status pin is higher than a fourth threshold; and enter under voltage protection mode if the voltage value at the status pin is higher than a fifth threshold.

15. The integrated circuit of claim 12, further comprising:

a set pin, wherein the set pins of all the integrated circuits are coupled together, to set a switching frequency of the integrated circuits.

* * * * *